(12) United States Patent
Leon et al.

(10) Patent No.: US 6,827,536 B1
(45) Date of Patent: Dec. 7, 2004

(54) DEVICE FOR ASSEMBLING TWO PANELS OR THE LIKE AND FORMED BY CO-OPERATING PARTS

(75) Inventors: Jean-Pierre René Leon, Houlles (FR); Philippe Maurice Georges Bluon, Aubervillers (FR); Rodolphe Dominique Gilles Perol, Germaine en Laye (FR)

(73) Assignee: Rapid S.A., Paris (FR)

( * ) Notice: Subject to any disclaimer, the term of this patent is extended or adjusted under 35 U.S.C. 154(b) by 0 days.

(21) Appl. No.: 09/890,505

(22) PCT Filed: Feb. 18, 2000

(86) PCT No.: PCT/FR00/00418
§ 371 (c)(1),
(2), (4) Date: Jul. 31, 2001

(87) PCT Pub. No.: WO00/49299
PCT Pub. Date: Aug. 24, 2000

(30) Foreign Application Priority Data

Feb. 19, 1999 (FR) .............................................. 99 02091
Jul. 23, 1999 (FR) .............................................. 99 09608

(51) Int. Cl.[7] .............................................. F16B 13/06

(52) U.S. Cl. .......................... 411/61; 411/45; 411/57.1

(58) Field of Search ........................ 411/45–48, 57.1, 411/61, 349, 549, 552, 553, 183, 182, 550, 544, 545

(56) References Cited

U.S. PATENT DOCUMENTS

| 2,244,975 | A | | 6/1941 | Tinnerman |
| 4,007,516 | A | * | 2/1977 | Coules .................... 174/138 D |
| 4,630,338 | A | * | 12/1986 | Osterland et al. ............. 24/293 |
| 4,709,525 | A | * | 12/1987 | Adell ........................ 52/716.6 |
| 4,874,276 | A | | 10/1989 | Iguchi |
| 4,878,791 | A | | 11/1989 | Kurihara et al. |
| 5,100,273 | A | | 3/1992 | Vassiliou |
| 5,447,005 | A | * | 9/1995 | Giannuzzi ..................... 52/698 |
| 5,568,675 | A | * | 10/1996 | Asami et al. .................. 24/453 |
| 5,709,516 | A | * | 1/1998 | Peterson et al. ............ 411/544 |
| 5,774,949 | A | * | 7/1998 | Cornell et al. ................. 24/293 |
| 6,209,178 | B1 | * | 4/2001 | Wiese et al. .................. 24/458 |
| 6,280,129 | B1 | * | 8/2001 | Lowry et al. .................. 411/55 |
| 6,287,043 | B1 | * | 9/2001 | Kraus ........................ 403/297 |

FOREIGN PATENT DOCUMENTS

| EP | 0450820 A | 10/1991 |
| FR | 2464396 A | 3/1981 |
| GB | 1163400 A | 9/1969 |
| GB | 1260094 A | 1/1972 |

* cited by examiner

*Primary Examiner*—William L. Miller
(74) *Attorney, Agent, or Firm*—Cohen, Pontani, Lieberman & Pavane

(57) ABSTRACT

A device for assembling two panels and formed by a male part (1) and a female part (2), designed to be inserted into bores provided in these panels, the female part being constituted by an elastically deformable clip (2) provided with a cap (20). The cap (2) is itself elastically deformable, so as to prevent any play between the panels.

32 Claims, 6 Drawing Sheets

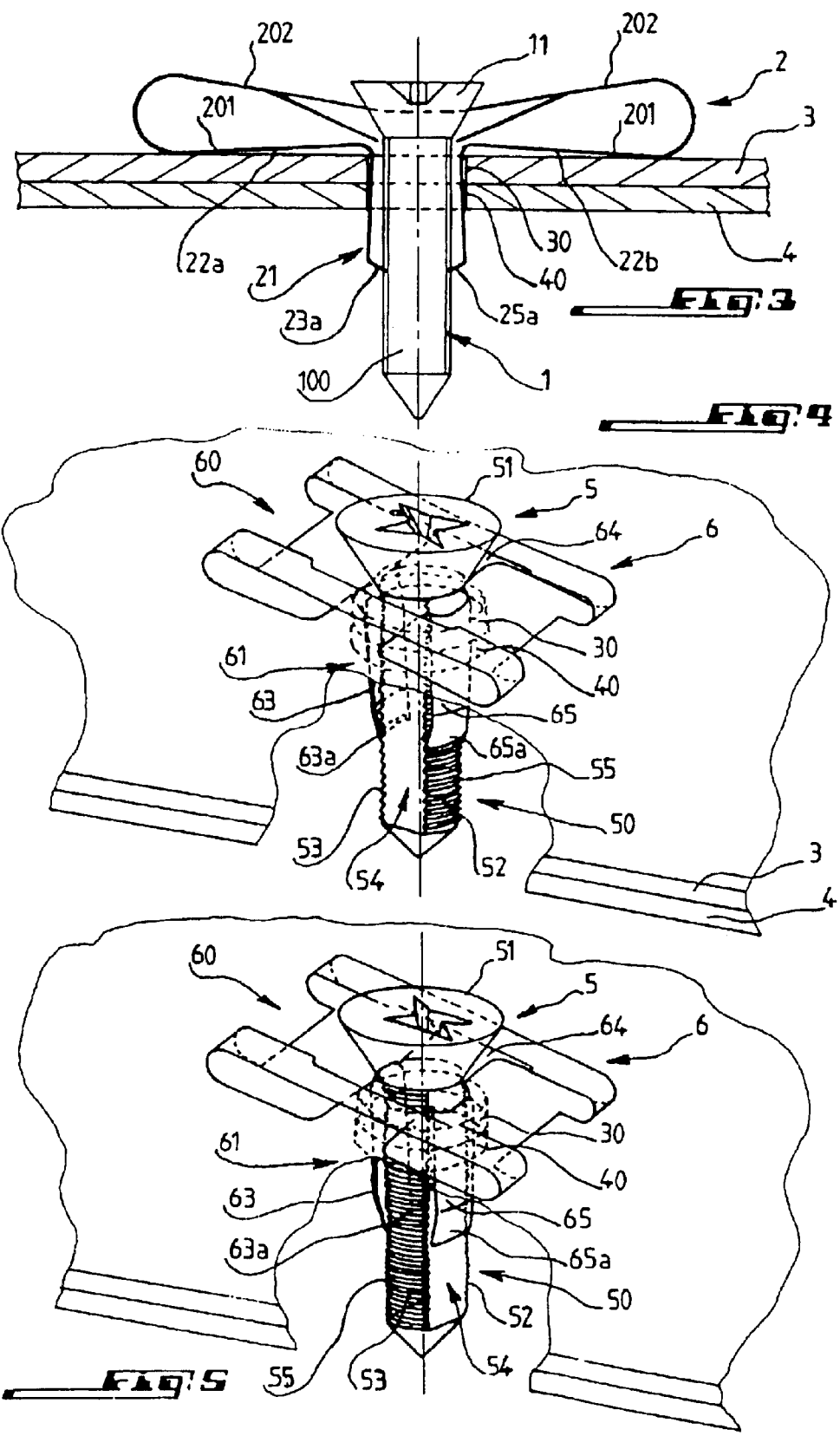

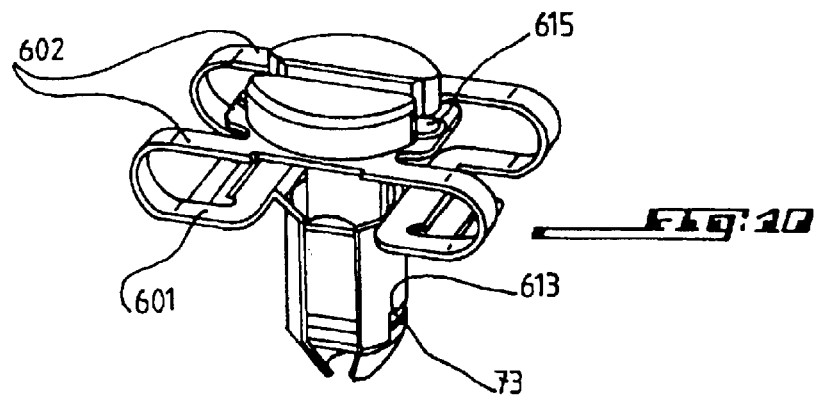
_Fig. 10_
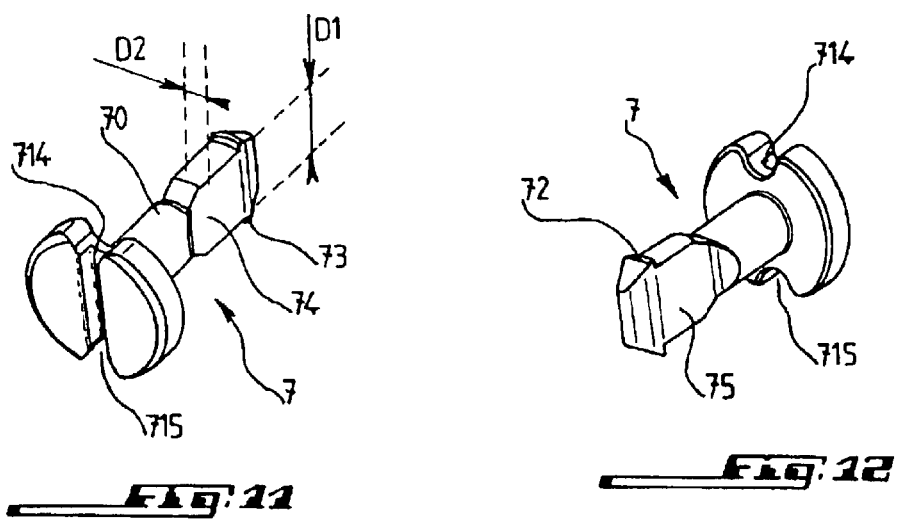
_Fig. 11_   _Fig. 12_
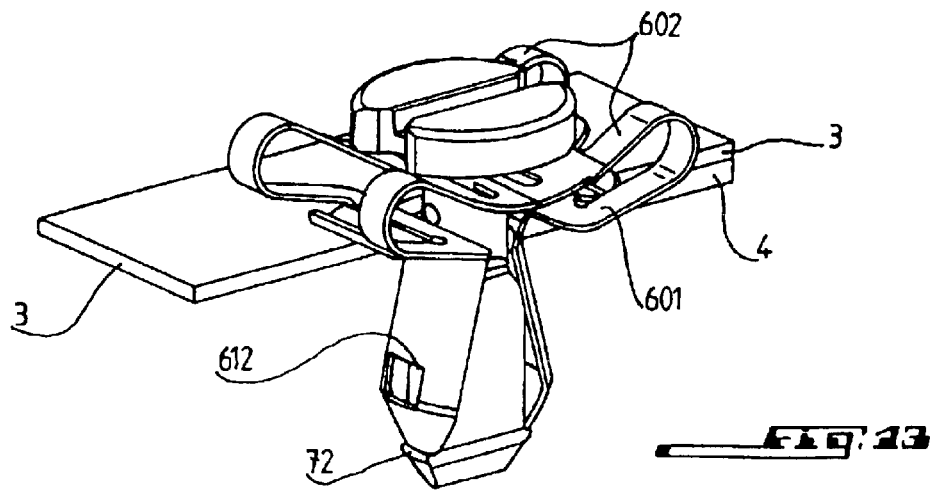
_Fig. 13_

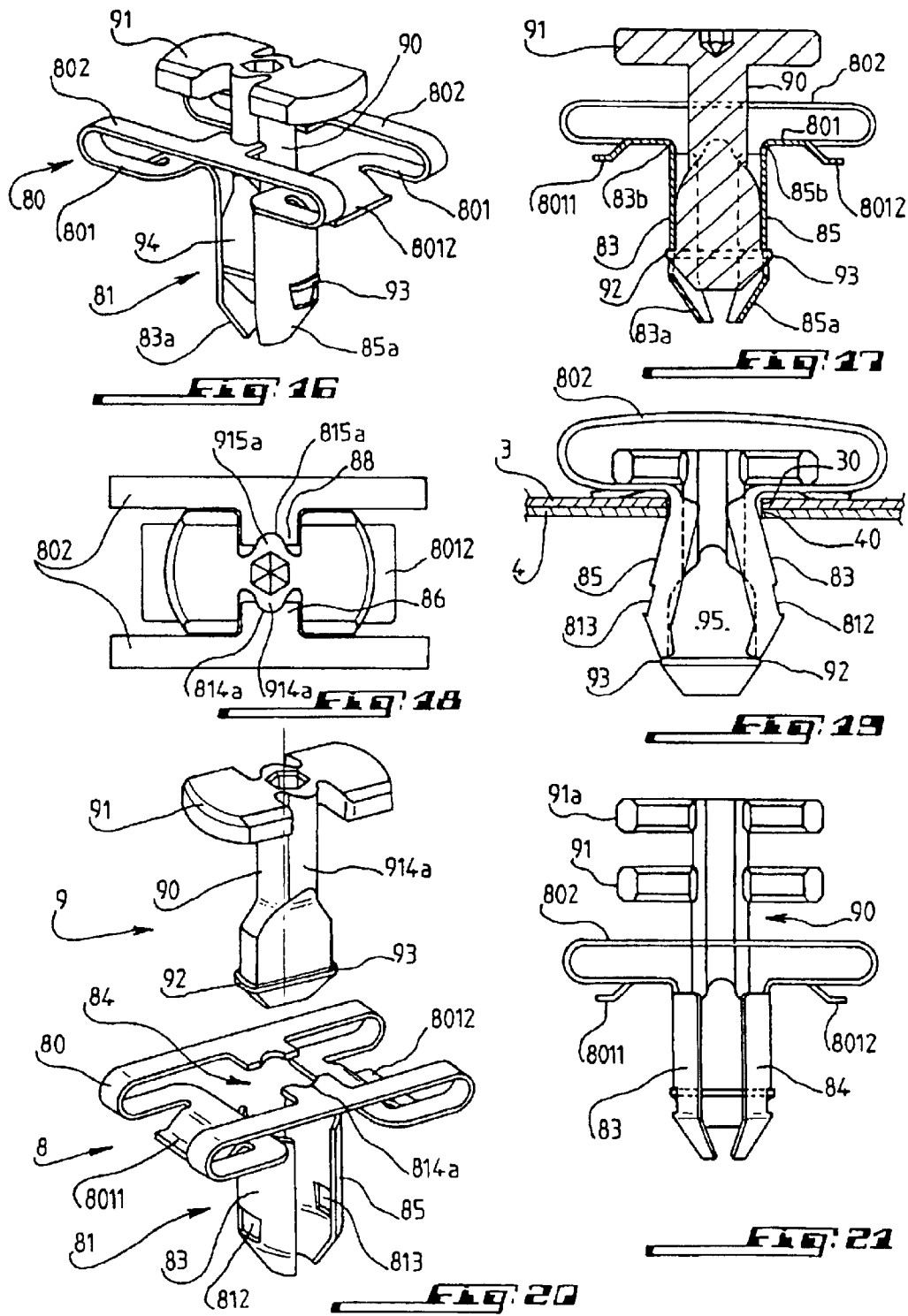

DEVICE FOR ASSEMBLING TWO PANELS OR THE LIKE AND FORMED BY CO-OPERATING PARTS

This application is a U.S. National Phase Application under 35 USC 371 of International Application PCT/FR00/00418 (not published in English) filed Feb. 18, 2000.

FIELD OF THE INVENTION

The present invention concerns a fastening device comprising a male part and a female part selectively inserted into bores passing through a stack of at least two panels, these parts selectively cooperating with one another to mainstain the panels in a stack.

BACKGROUND OF THE INVENTION

More precisely, the present invention concerns a fastening device comprising a male part and a female part selectively inserted into bores passing through a stack of at least two panels, these parts selectively cooperating with one another to maintain the panels in a stack, in which device the female part is an elastic clip formed by a cap extended by a hollow foot having different minimum and maximum internal transverse dimensions, in which the male part comprises a head extended by a barrel having at least a first given intermediate transverse dimension, between the minimum and maximum internal transverse dimensions, this barrel being selectively inserted into the hollow foot through an opening in the cap, and the hollow foot selectively adopting, as a function of at least one relative axial position of the barrel and the hollow foot, and for at least a first relative rotational position of the barrel and the foot, an unlocked configuration in which the foot has a reduced transverse dimension, and a locked configuration in which the foot is subjected by the barrel to a radial elastic expansion.

Devices of this type are described, for example, in the patent documents FR-2 464 396, GB-1 260 094 and GB-1 163 400.

In spite of the diversity of the structures that these documents of the prior art illustrate, the known devices do not make it possible to maintain a stack of panels without play, at least within a given range of thickness of this stack.

SUMMARY OF THE INVENTION

In this context, the object of the present invention is specifically to offer a device capable of solving this problem.

To this end, the device of the invention, which otherwise conforms to the generic definition given in the above preamble, is essentially characterized in that the cap is formed by a spring blade that is bent back on itself and that comprises at least one inner branch joined to the hollow foot and one outer branch into which the opening of the cap is pierced, and in that the inner and outer branches are apart from one another at least for the unlocked configuration of the hollow foot and are shaped so as to allow an elastic deformation of at least part of the outer branch when the foot moves from its unlocked configuration to its locked configuration.

In a preferred embodiment of the invention, the hollow foot comprises a plurality of prongs having respective attached ends by which these prongs are joined to the cap, and respective radially converging free ends, which between them define the minimum internal transverse dimension of the foot.

The male and female parts advantageously comprise at least first and second respective surface features disposed facing one another for an extreme relative axial position of the male and female parts, selectively obtained by completely inserting the barrel into the foot, the first and second surface features mutually cooperating to maintain the male and female parts in the extreme relative axial position.

The first surface feature can for example be formed by a radial protuberance of the barrel, such as a screw thread if the barrel is a threaded shaft, or a lug, and the second surface feature can be formed by the free ends of the prongs.

To increase the deformation of the foot between its unlocked configuration and its locked configuration, the first surface feature can advantageously be constituted by a lug disposed facing a corresponding hole in the foot, this lug passing through the hole when the foot is in both the unlocked configuration and the first rotational position relative to the barrel.

In an effective embodiment of the invention, the hollow foot comprises two prongs separated from one another by an open space for the unlocked configuration of the foot, and the barrel has at least a second transverse dimension that selectively enters the open space, the result of which is that the hollow foot selectively adopts its unlocked configuration for a second relative rotational position of the barrel and of the foot, independently from the relative axial position of the male and female parts.

For example, the barrel includes two smooth parts, each forming a flat surface running axially, these smooth parts making it possible to unscrew the fastening device by rotating the barrel relative to the foot.

In this case, the male and female parts advantageously comprise at least third and fourth respective surface features disposed facing one another for the locked configuration of the foot, these third and fourth surface features mutually cooperating to maintain the male and female parts in their first relative rotational position.

An elastic radial tab can be provided in the opening of the cap in order to selectively cooperate with the barrel and maintain it in a given axial position, or in a rotational position that determines either the locked or the unlocked configuration.

Furthermore, the inner branch of the cap preferably includes at least two internal elastic tabs capable of applying pressure to the stack of panels in the locked configuration of the foot.

The clip is advantageously formed by cutting, bending and heat treating a metal blank, for example made of tempered steel.

The third and fourth surface features can respectively be constituted by an axial rib of the barrel and a corresponding cutout of the cap, or by a recess of the head and a boss of the cap.

The barrel can also have a collar inserted into the opening of the cap counter to an elastic force and rendering the male and female parts inseparable from one another.

In order to obtain an elastic deformation of the outer branch, it is possible to provide for the head to press against this outer branch, for the locked configuration of the foot, and to move the inner and outer branches toward one another so as to generate an elastic stress between them.

However, it is also possible to provide for the head to pass through the outer branch and come to rest against the inner branch of the cap for the locked configuration of the foot.

In the latter case, which makes it possible to maintain stacks of various thicknesses without changing the diameter of the bores that pass through them, the male part can include a second head that remains outside the outer branch, even for the locked configuration of the foot, which facilitates the removal of the device.

The external surface of the hollow foot preferably corresponds to the shape of the bores provided in the stack of panels, the largest transverse dimension of the bore in the bottom panel itself being adapted to the thickness of the stack, particularly if the elastic deformation of the outer branch is obtained by means of a pressure exerted on this branch by the head.

Thus, the invention also concerns an assembly constituted by a fastening device as defined above in connection with this solution, and by a stack of panels or the like in which bores are provided, this assembly being such that:

the combined thickness of the panels is between 0.5 and 3 mm, while the largest transverse dimension of the bore in the bottom panel is 7.7 mm;

or the combined thickness of the panels is between 3 and 4.5 mm, while the largest transverse dimension of the bore in the bottom panel is 8.2 mm;

or the combined thickness of the panels is between 4.5 and 6 mm, while the largest transverse dimension of the bore in the bottom panel is 8.7 mm;

or the combined thickness of the panels is between 6 and 7 mm, while the largest transverse dimension of the bore in the bottom panel is 9.2 mm.

BRIEF DESCRIPTION OF THE DRAWINGS

Other objects, characteristics and advantages of the invention will clearly emerge from the detailed description of it given below as an illustrative and non-limiting example, in reference to the attached drawings, given only as examples, and in which:

FIG. 3 is an axial sectional view of the fastening device illustrated in FIGS. 1 and 2, once mounted on the panels;

FIG. 4 is a view in perspective of a variant of embodiment of a fastening device according to the invention in a locked position on the panels;

FIG. 5 is a view similar to FIG. 4 showing the fastening device according to the invention in an unlocked position;

FIG. 10 is a view in perspective of the fastening device of FIG. 6;

FIG. 11 is a first view in perspective of the male part of the fastening device of FIG. 6;

FIG. 12 is a second view in perspective of the male part of the fastening device of FIG. 6;

FIG. 13 is a view in perspective of the fastening device of FIG. 6 represented in its configuration illustrated in FIG. 7;

FIG. 16 is a view in perspective of a device according to another embodiment of the invention, represented in its unlocked configuration;

FIG. 17 is an axial sectional view of the device illustrated in FIG. 16;

FIG. 18 is a top view of the device illustrated in FIG. 16;

FIG. 19 is a side view of the device illustrated in FIG. 16, represented in its locked configuration;

FIG. 20 is a view in perspective of the device illustrated in FIG. 16, shown disassembled; and FIG. 21 is a side view of a device constituted by a variant of the device illustrated in FIG. 16, represented in its unlocked configuration.

DETAILED DESCRIPTION OF THE DRAWINGS

By convention, elements designated by the same references in different figures should be considered to be equivalent or identical. On the other hand, the fact that elements appearing in different figures are designated by different references does not necessarily imply that these elements are or must imperatively be different, particularly if they are designated by the same name.

Figure 1:
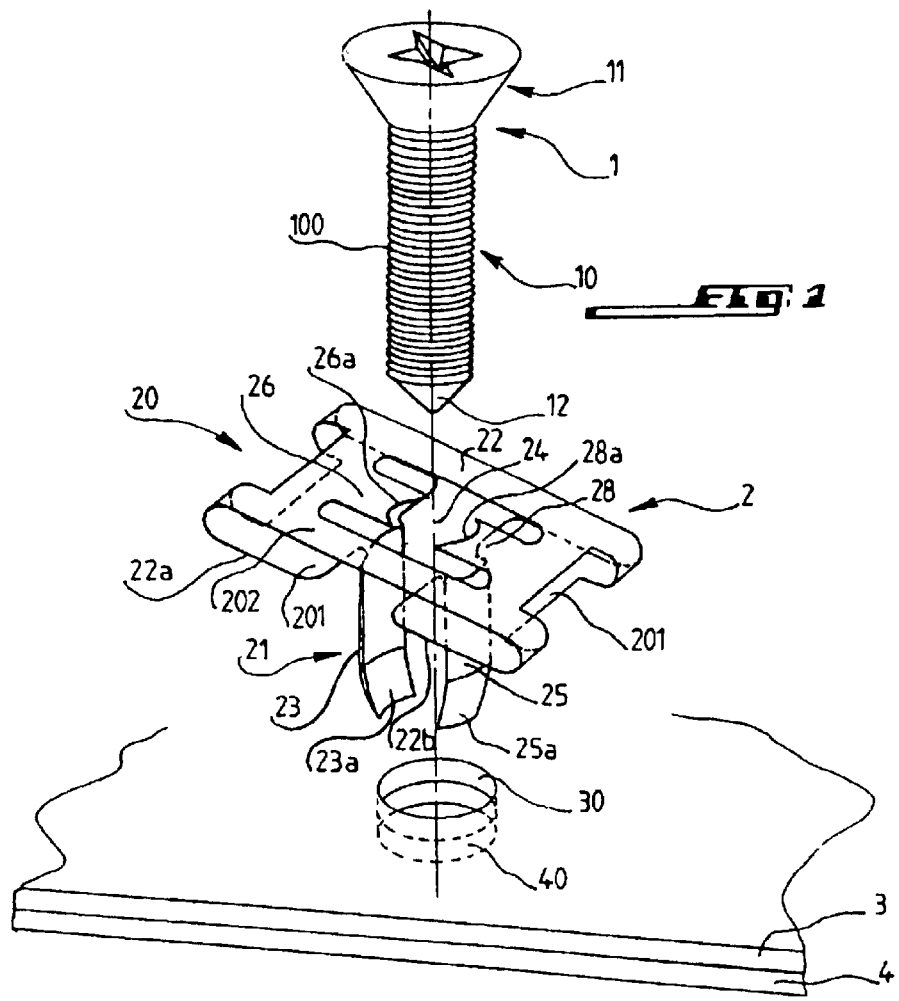
FIG. 1 is an exploded view in perspective of the fastening device according to the invention.

FIG. 1 shows a fastening device according to the invention, constituted by two cooperating parts, i.e. a male part 1, for example taking the form of a screw or a metal or plastic pin, and a female part 2 constituted by an elastically deformable clip, preferably metal.

The male part 1 comprises a barrel or a shaft 10 that may or may not be threaded, i.e., have a threading such as 100, as shown in FIGS. 1 through 5, or smooth as shown in FIGS. 6 through 20.

The male part also comprises a head 11 at one end of the barrel or the shaft 10.

Although the various attached figures show the head 11 in the form of an enlargement of the barrel or shaft 10, the advantage of which will be described below, the head 11 could simply be constituted by a non-enlarged end of the shaft 10, as long as it makes it possible to displace the barrel or shaft 10 axially and angularly.

The clip 2 has a general T-shape whose horizontal bar is the cap 20 and whose vertical bar is the foot 21.

The cap 20 is preferably constituted by a metal blank 22, partially cut out, whose edges 22a and 22b are bent back. This makes it possible to make the cap 20 elastically deformable.

An opening 24 is provided in the blank 22 for the passage of the shaft 10.

The cap 20 is extended by the foot 21, which is hollow and is disposed facing the opening 24.

In the exemplary embodiments illustrated, the foot 21 is constituted by two prongs such as 23 and 25. Each of these prongs 23, respectively 25, extends from a bent edge 22a, respectively 22b, of the cap 20. In practice, the foot 21 and the cap 20 can be obtained from the same metal blank; however, the invention is not limited to this embodiment of the clip 2.

Moreover, the foot 21 could possibly include a different number of prongs.

According to the invention, the free ends 23a, 25a of the prongs 23 and 25 are inclined toward the inside of the foot 21, in the direction of the insertion of the shaft 10 into the clip 2, i.e., from top to bottom in FIG. 1.

In the exemplary embodiment illustrated in FIG. 1, the blank 22 also includes two radial tabs 26, 28 that extend into the opening 24.

The edge of the free end 26a, 28a of each of these tabs 26, 28 has a concave shape that corresponds to the external shape of the shaft 10, these two free end edges defining a passage whose dimensions are slightly smaller than the diameter of the shaft 10.

Thus, even before the mounting of the fastening device onto the panels 3 and 4, the male element 1, in this case the screw 1, can be slightly inserted into the opening 24 of the clip 2 and be held there as a result of the cooperation of the radial tabs 26 and 28 with the threading 100 of the shaft 10.

The fastening device according to the invention can thus come in the form of two parts that have already been joined together. This pre-assembly of the shaft 10 and the clip 2 makes it possible to save time during the placement of the fastening device according to the invention on the panels 3 and 4.

The panels 3 and 4 onto which the fastening device is designed to be mounted include respective bores 30, 40 disposed in line with one another when these panels are superposed, even though they may be of different shapes and sizes.

Of course, the diameter of the shaft 10 and the foot 21 of the clip 2 are chosen so that they can be inserted into the bores 30 and 40.

The mounting of the fastening device according to the invention onto the two superposed panels 3 and 4 will now be described in reference to FIGS. 2 and 3.

Figure 2:
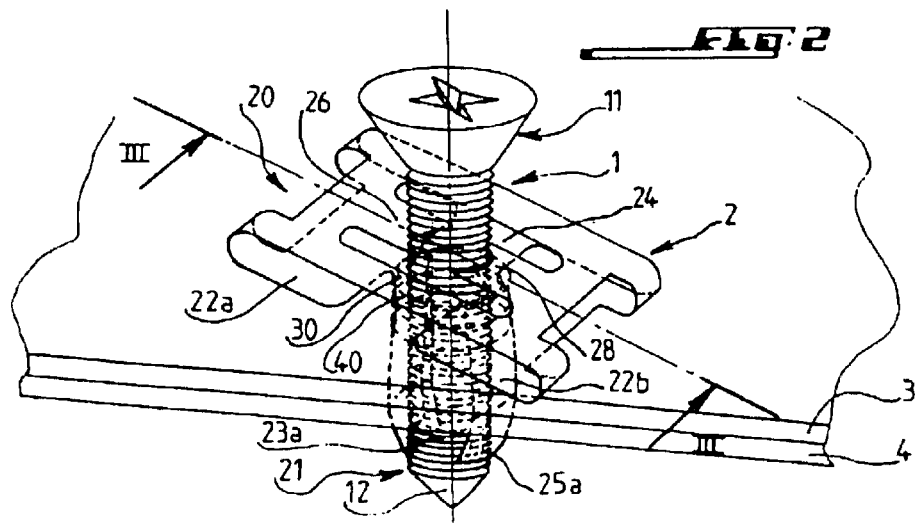
FIG. 2 is a view similar to FIG. 1, which shows the device according to the invention in the process of being mounted on some panels.

Referring first of all to FIG. 2, which represents the fastening device during mounting, the clip 2 has been inserted into the openings 30, 40 by its foot 21. The edges 22a and 22b of the clip are therefore in contact with the top panel 3, while the foot 21 extends past the panel 4.

The shaft 10 is then inserted into the opening 24, by its point 12. As indicated above, if the shaft 10 and the clip 2 have been pre-assembled, one need only exert pressure on the head 11 in order to push the shaft into the foot 21 of the clip.

When the shaft 10 is pushed far enough into the foot 21, it spreads the prongs 23 and 25 outward as a result of the cooperation between the free ends 23a and 25a of the prongs and the shaft 10, which produces the assembly of the panels 3 and 4. In addition, the cooperation between the free ends and the shaft prevents any extraction of the shaft.

In essence, the free ends 23a and 25a are inclined toward the inside of the foot 21 and therefore come into contact with the shaft 10 so as to stop it, even if it is smooth.

In the example represented in FIGS. 1 through 5, the shaft 10 includes a threading 100 and the free ends 23a and 25a are inserted into the threading.

Moreover, the ends 23a and 25a of the prongs are inclined in the direction of the insertion of the shaft. Thus, they do not oppose the insertion of the shaft 10 into the foot 21, but they oppose any pulling force that would tend to remove the shaft from the clip.

Let us now refer to FIG. 3, which illustrates the fastening device according to the invention mounted onto the panels 3 and 4.

From the relative position of the shaft 10 and the clip illustrated in FIG. 2, the shaft 10 has been pushed further into the clip 2, until its head 11 comes to rest against the clip. The clip 2 is elastically deformed under the effect of the pressure exerted by the shaft 10.

The shaft 10 places the clip 2 under stress, which makes it possible to better immobilize the panels 2 and 3 and, in particular, to prevent vibrational phenomena.

As indicated previously in connection with FIG. 2, the free ends 23a and 25a of the prongs are inserted into the threading 100 of the shaft 10 and hence oppose any force that would tend to extract the shaft 10 from the clip 2.

The fastening device according to the invention is then in a locked position, thus ensuring a solid fastening.

When wishing to disconnect the panels 3 and 4, one need only unscrew the shaft 10, for example using an appropriate tool that engages with the head 11.

The fastening device according to the invention can thus be easily unscrewed.

A variant of embodiment of the fastening device according to the invention will now be described in reference to FIGS. 4 and 5.

The fastening device according to the invention always includes a male element 5 and a clip 6 in a general T-shape and elastically deformable.

The male element comprises a shaft 50 that differs from the threaded shaft 10 in that it includes two diametrically opposed flat surfaces 54 and 55 running axially, which means that the shaft comprises two smooth parts that are joined to one another by threaded parts 52, 53.

In addition, the male element 5 always includes a head 51.

The clip 6, like the clip 2 illustrated in FIGS. 1 through 3, comprises a cap 60 and a foot 61.

The cap 60 is formed from a strip of sheet metal, cut out and bent so as to make the cap elastic. It is extended by two prongs 63 and 65, which form the foot 61.

Moreover, the hollow foot is clearly located in the extension of the opening 64 provided in the cap 6 for the passage of the shaft 50.

FIG. 4 shows the device according to the invention mounted onto the panels 3 and 4 by being inserted into the bores 30 and 40 of these panels.

The shaft 50 is inserted into the clip 6 in such a way that the threaded parts 52 and 53 are located facing the two prongs 63 and 65 of the foot 61.

Thus, in this mounted position of the device the free ends 63a and 65a of the prongs are inserted into the thread of the threaded parts 52 and 53 of the shaft 50 and therefore oppose its extraction from the clip 6.

In this configuration, the fastening device according to the invention ensures an effective locking.

When wishing to disconnect the panels 3 and 4, one need only turn the shaft 50 by a quarter turn, so that the smooth parts 54 and 55 are located facing the prongs 63 and 65. The shaft 50 can then be easily removed from the clip 6, without its being necessary to unscrew it.

Of course, the rotation exerted on the shaft 50 in order to unlock it depends on the structure of the shaft and the foot and is not necessarily a quarter turn in all cases.

In this variant of embodiment, the unlocking of the fastening device according to the invention is faster than in the embodiment illustrated in FIGS. 1 through 3.

Generally, it is preferable for the external surface of the foot of the clip to correspond to the shape of the bores provided in the panels 3 and 4, but this is not mandatory.

The clip of the fastening device according to the invention is, moreover, advantageously made of tempered steel.

It has also been clearly demonstrated that the same fastening device, as described up to this point, could be used for panels whose combined thickness varies, insofar as the diameter, or more generally the largest transverse dimension, of the bore provided in the bottom panel is appropriately chosen.

One could refer to the table below:

| | | | | |
|---|---|---|---|---|
| combined thickness of the two panels (in mm) | 0.5 to 3 | 3 to 4.5 | 4.5 to 6 | 6 to 7 |
| largest transverse dimension of the bore (in mm) | 7.7 | 8.2 | 8.7 | 9.2 |

The device illustrated in FIGS. 6 through 15 uses, as the male piece 7, a pin having a barrel 70 without any threading, and a head 71.

As in the preceding examples, the female piece is an elastic clip 6 formed by a cap 60 extended by a hollow foot 61, the latter having minimum and maximum internal transverse dimensions Dmin and Dmax, respectively smaller and larger than the largest transverse dimension D1 of the barrel 70.

Figure 6:
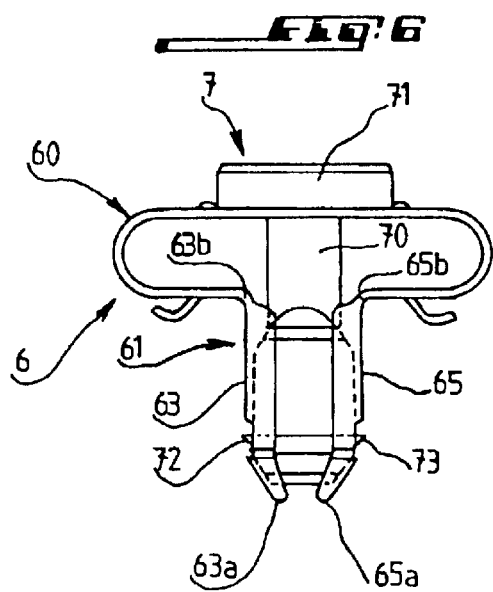
FIG. 6 is a front view of a second variant of embodiment of a fastening device according to the invention, in an unlocked configuration, and in which the male and female parts adopt a first relative rotational position.
Figure 7:
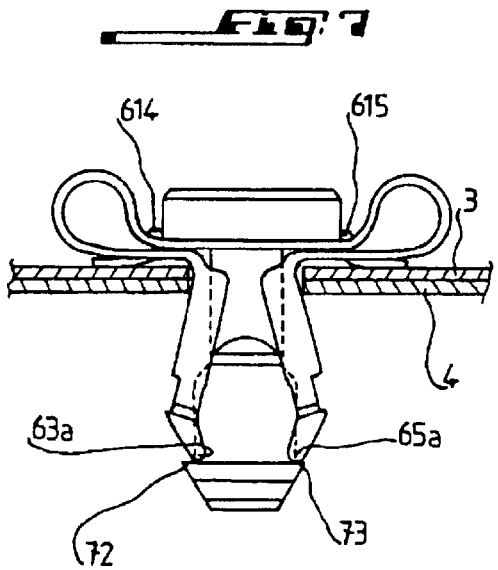
FIG. 7 is a front view of the fastening device of FIG. 6, in a locked configuration on panels seen in cross-section.

The hollow foot 61 can, as a function of at least one relative axial position of the barrel 70 and the foot 61, and at least for the relative rotational position of the barrel and the foot illustrated in FIGS. 6 and 7, adopt an unlocked configuration (FIG. 6), in which the foot 61 has a reduced transverse dimension, and a locked position (FIG. 7), in which the foot 61 is subjected by the barrel 70 to a radial elastic expansion, as a result of which the panels 3 and 4 are maintained in a stack.

As in the preceding examples, the foot 61 comprises two prongs 63, 65 having respective attached ends 63b, 65b by which these prongs are joined to the cap 60, and respective radially convergent free ends 63a, 65a, which between them define the minimum internal transverse dimension Dmin of the foot 61.

The male 7 and female 6 parts include respective surface features 72, 73 and 63a, 65a, disposed facing one another for the fully inserted position of the male part inside the female part (FIG. 7), these surface features mutually cooperating to ensure the maintenance of the male 7 and female 6 parts in their locked position illustrated in FIG. 7.

As in the preceding examples, the surface features borne by the female part are formed by the free ends 63a, 65a of the prongs 63, 65, this arrangement being merely a preferred arrangement.

On the other hand, although they are always formed by radial protuberances of the barrel, the surface features borne by the male part in this case take the form of lugs 72, 73.

As in the preceding examples, the cap 60 is formed by a spring blade bent back on itself and comprising an inner branch 601 joined to the foot 61 and an outer branch 602 into which the opening 64 of the cap is pierced.

Figure 8:
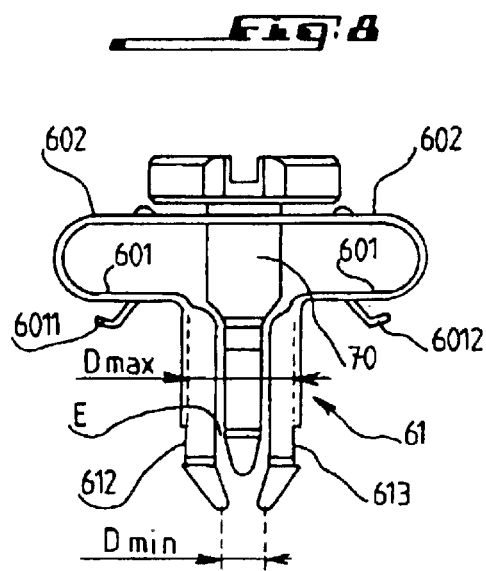
FIG. 8 is a front view of the fastening device of FIG. 6, in an unlocked configuration, in which the male and female parts adopt a second relative rotational position.

The inner and outer branches 601, 602 are apart from one another for the unlocked configuration of the foot 61, as shown in FIGS. 6 and 8, and are shaped so as to allow an elastic deformation of at least part of the outer branch when the foot moves from its unlocked configuration to its locked configuration.

Figure 14:
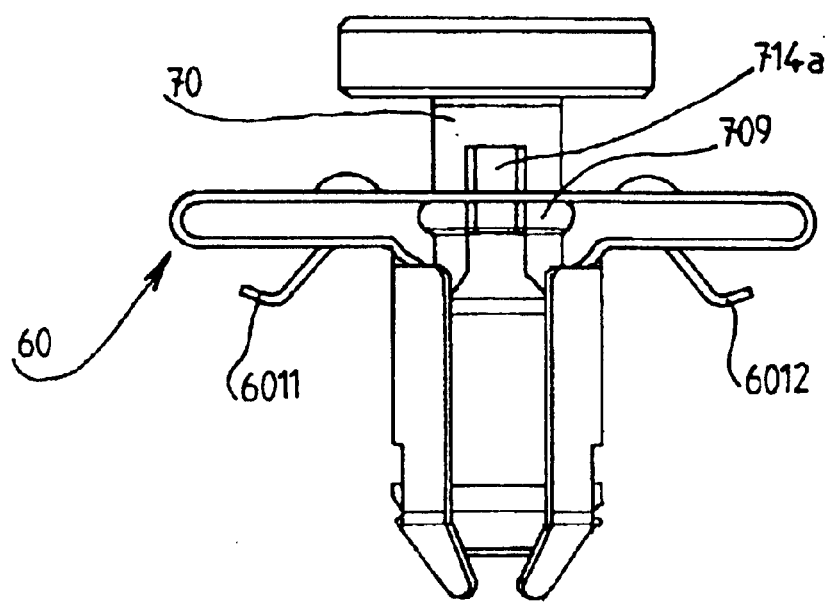
FIG. 14 is a front view of another variant of embodiment of the fastening device of the invention.

For the locked configuration of the foot 61 illustrated in FIG. 7, and for this embodiment, the head 71 comes to rest against the outer branch 602 and moves the inner and outer branches 601, 602 toward one another so as to generate an elastic stress between them, which makes it possible to eliminate the play between the panels 3, 4 of the stack, which stress can be considerably increased by equipping the inner branch 601 of the cap with internal elastic tabs such as the tabs 6011 and 6012 visible in FIGS. 8 and 14.

In this embodiment, in order to obtain an effective elastic deformation of the outer branch 602 of the cap 60, the inner 601 and outer 602 branches are shaped so as to connect to one another at a distance from the area of the outer branch on which the head 71 presses, the outer branch 602 thus being able to be elastically deformed, at least in the area of its connecting loops with the inner branch 601.

As shown in FIGS. 6 and 10, the lugs 72, 73 are disposed facing corresponding holes 612, 613 of the foot (indicated in FIG. 8), each lug passing through the corresponding hole when the foot 61 is in both the unlocked configuration and in the rotational position relative to the barrel 70 illustrated in FIGS. 6 and 7.

The barrel 70 includes two flat surfaces 74 and 75 (FIGS. 11 and 12), so that it has, in addition to its larger transverse dimension D1 (FIG. 11), a smaller transverse dimension D2.

As shown in FIG. 8, the barrel 70 can thus be inserted, by its smaller transverse dimension, into the open space E defined between the prongs 63, 65 for the unlocked configuration of the foot, so that the foot 61 adopts its unlocked configuration for the relative rotational position of the barrel 70 and the foot 61 illustrated in FIG. 8, independently from the relative axial position of the male 7 and female 6 parts.

In order to prevent an untimely rotation of the male and female parts in the locked configuration of the foot, the male 7 and female 6 parts comprise respective additional surface features, i.e. 714, 715 and 614, 615, which face one another for the locked configuration of the foot 61, and which cooperate to maintain this configuration.

Figure 9:
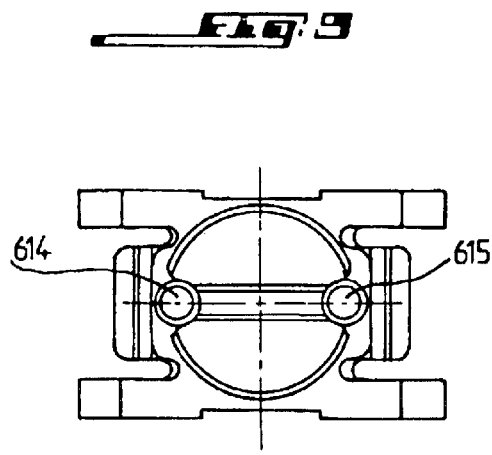
FIG. 9 is a top view of the fastening device of FIG. 6, in its configuration illustrated by FIG. 7.
Figure 15:
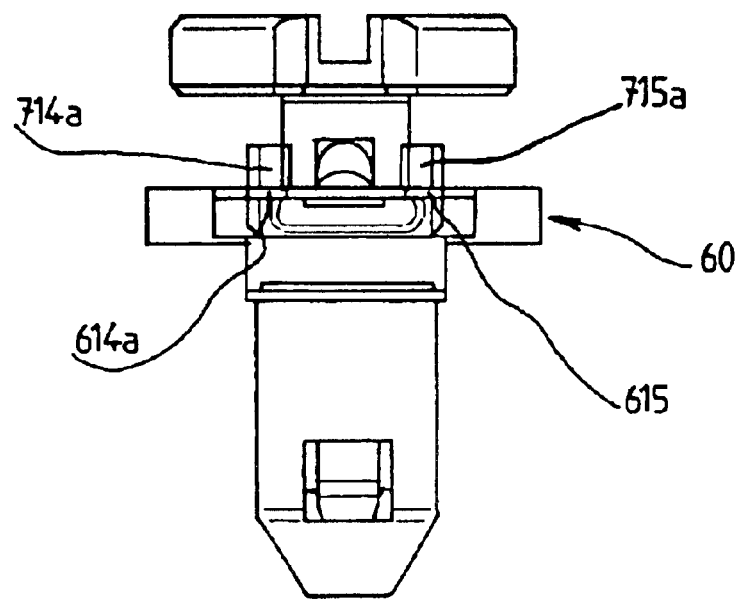
FIG. 15 is a side view of the device illustrated in FIG. 14.

The additional surface features are for example constituted by recesses 714 and 715 in the head 71, and by bosses 614 and 615 on the cap, as shown in FIGS. 9 and 11, or by axial ribs 714a, 715a on the barrel and by corresponding cutouts 614a, 615a in the cap, as shown in FIGS. 14 and 15.

As in the preceding examples, the clip 6 is preferably produced by cutting, bending and heat treating a steel blank.

Lastly, the barrel 70 can, as shown in FIGS. 14 and 15, have a collar 709 inserted into the opening of the cap counter to an elastic force and rendering the male and female parts inseparable from one another.

The device illustrated in FIGS. 16 through 21, which represent a highly advantageous development of the device described up to this point, still uses, as the male part 9, a pin having a barrel 90 without any threading, and a head 91.

As in the preceding examples the female part is an elastic clip 8 formed by a cap 80 extended by a hollow foot 81, the latter having minimum and maximum internal transverse dimensions, respectively smaller and larger than the largest transverse dimension of the barrel 90.

The hollow foot 81 can, as a function of at least one relative axial position of the barrel 90 and the foot 81, and at least for the relative rotational position of the barrel and the foot illustrated in FIGS. 16 and 19, adopt an unlocked configuration (FIG. 16), in which the foot 81 has a reduced transverse dimension, and a locked configuration (FIG. 19), in which the foot 81 is subjected by the barrel 90 to a radial elastic expansion, as a result of which the panels 3 and 4 are maintained in a stack.

As in the preceding examples, the foot 81 comprises two prongs 83, 85 having respective attached ends 83b, 85b by which these prongs are joined to the cap 80, and respective radially convergent free ends 83a, 85a, which between them define the minimum internal transverse dimension of the foot 81.

The male 9 and female 8 parts comprise respective surface features 92, 93 and 83a, 85a, disposed facing one another for the fully inserted position of the male part inside the female part (FIG. 19), these surface features mutually cooperating to ensure the maintenance of the male 9 and female 8 parts in their position illustrated in FIG. 19.

As in the preceding examples, the surface features borne by the female part are formed by the free ends 83a, 85a of the prongs 83, 85, this arrangement being merely a preferred arrangement.

As in the device described in reference to FIGS. 6 through 15, the surface features borne by the male part take the form of lugs 92 and 93.

Also as in the preceding examples, the cap 80 is formed by a spring blade bent back on itself and comprising an inner branch 801 joined to the foot 81 and an outer branch 802 into which the opening 84 of the cap is pierced, the inner and outer branches 801, 802 being apart from one another as shown in FIGS. 16 and 17.

The lugs 92, 93 are disposed facing corresponding holes 812, 813 in the foot (indicated in FIG. 19), each lug passing through the corresponding window when the foot 81 is in both the unlocked configuration and the rotational position relative to the barrel 90 illustrated in FIGS. 16 and 17.

The barrel 90 comprises two flat surfaces 94 and 95 (FIGS. 16 and 19) so as to have, in addition to its larger transverse dimension, a smaller transverse direction.

As shown in FIG. 8 for the preceding embodiment, the barrel 90 can thus be inserted, by its smaller transverse dimension, into the open space defined between the prongs 83, 85 for the unlocked configuration of the foot, so that the foot 81 can adopt its unlocked configuration independently from the relative axial position of the male 9 and female 8 parts.

In order to avoid an untimely rotation of the male and female parts in the locked configuration of the foot, the male 9 and female 8 parts comprise respective additional surface features, for example taking the form of axial ribs 914a, 915a of the barrel and corresponding cutouts 814a, 815a forming guides, provided in the radial tabs 86, 88 of the cap, as shown in FIG. 18.

Elastic tabs 8011 and 8012 are preferably provided inside the inner branch 801 of the cap in order to apply pressure to the stack of panels in the locked configuration of the foot.

As in the preceding examples, the clip 8 is preferably produced by cutting, bending and heat treating a steel blank, the male part 9 itself possibly being constituted by a pin made of plastic material.

In spite of its similarities to the device illustrated in FIGS. 6 through 15, the device illustrated in FIGS. 16 through 21 has a significant novel quality, which allows it to maintain stacks of panels with very different thicknesses, for example running from 0.5 millimeters to 7 millimeters, without changing the transverse dimension of the bores provided in the panels, for example equal to 8.2 millimeters.

This novel quality resides in the fact that, in order to allow the elastic deformation of the outer branch 802 of the cap when the foot 81 moves from its unlocked configuration to its locked configuration, the head and the cap are shaped so that the head 91 passes through the outer branch 802 of the cap 80 and comes to rest against the inner branch 801 of this cap 80 for the locked configuration of the foot 81.

As shown in FIG. 19, this arrangement gives the external branch 802 of the cap the capability to be elastically deformed along its entire length, and therefore gives it a greater capacity to absorb the more or less pronounced radial squeezing to which the clip is subjected, as a function of the smaller or larger thickness of the stack of panels 3, 4.

Finally, as shown in FIG. 21, the male part 9 can include a second head 91a that remains outside the outer branch 802, even for the locked configuration of the foot 81.

What is claimed is:

1. Fastening device comprising a male part (1, 5, 7,9) and a female part (2, 6, 8) adapted to be selectively inserted into bores (30, 40) passing through a stack of at least two panels (3, 4), wherein the female part (2, 6, 8) is an elastic clip comprising a cap (20, 60, 80) from which extends a hollow foot (21, 61, 81) having different minimum (Dmin) and maximum (Dmax) internal transverse dimensions, wherein the male part (1, 5, 7, 9) comprises a head (11, 51, 71, 91) extended by a barrel (10, 50, 70, 90) having at least a first given intermediate transverse dimension (DI), between the minimum (Dmin) and maximum (Dmax) internal transverse dimensions, the barrel being sized to be inserted into the hollow foot (21, 61, 81) through an opening (24, 64, 84) in the cap, with the hollow foot (21, 61, 81) and the barrel having an unlocked configuration with respect to each other as a function of at least one relative axial position of the barrel (10, 50, 70, 90) and the hollow foot (21, 61, 81), and for at least a first relative rotational position of the barrel and the foot, with the foot (21, 61, 81) having a reduced transverse dimension in the unlocked configuration, and the hollow foot and barrel having a locked configuration with respect to each other in which the foot (21, 61, 81) is subjected by the barrel (10, 50, 70, 90) to a radial elastic expansion, wherein the cap (20, 60, 80) is formed by a spring blade bent back on itself and comprising at least one inner branch (201, 601, 801) joined to the hollow foot (21, 61, 81) and one outer branch (202, 602, 802) having a medium portion into which the opening (24, 64, 84) of the cap is pierced, and in that the inner and outer branches (201, 202; 601, 602; 801, 802) are apart from one another at least for the unlocked configuration of the hollow foot (21, 61, 81) and are shaped so as to allow an elastic deformation of at least said medium portion of the outer branch (202, 602, 802) when the foot (21, 61, 81) moves from its unlocked configuration to its locked configuration, wherein said head of the male part directly contacts said medium portion of said cap when the foot moves to its locked configuration, so that said medium portion is elastically depressed under the effect of said head of said male part when said foot is in its locked configuration.

2. Fastening device according to claim 1, characterized in that the hollow foot (21, 61, 81) comprises a plurality of prongs (23, 25; 63, 65; 83, 85) having respective attached ends (63b, 65b; 83b, 85b) by which these prongs are joined to the cap (20, 60, 80), and respective radially converging free ends (63a, 65a; 83a, 85a), which between them define the minimum internal transverse dimension (Dmin) of the foot (21, 61, 81).

3. Fastening device according to claim 2, characterized in that the hollow foot (61, 81) comprises two prongs (63, 65; 83, 85) separated from one another by an open space (E) for the unlocked configuration of the foot, and in that the barrel (50, 70, 90) has at least a second transverse dimension (D2), that selectively enters the open space, the result of which is that the hollow foot (61; 81) selectively adopts its unlocked configuration for a second relative rotational position of the barrel (50, 70, 90) and the foot (61, 81), independently from the relative axial position of the male and female parts.

4. Fastening device according to claim 3, characterized in that the male (7) and female (6) parts comprise at least third (714, 715) and fourth (614, 615) respective surface features disposed facing one another for the locked configuration of the foot (61), these third and fourth surface features mutually cooperating to maintain the male (7) and female (6) parts in their first relative rotational position.

5. Fastening device according to claim 4, characterized in that the third (714a, 715a; 914a, 915a) and fourth (614a, 615a; 814, 815a) surface features are respectively constituted by an axial rib of the barrel and by a corresponding cutout of the cap.

6. Fastening device according to claim 4, characterized in that the third and fourth surface features are respectively constituted by a recess of the head and by a boss of the cap.

7. Fastening device according to claim 1, characterized in that the male (1, 5, 7, 9) and female (2, 6, 8) parts comprise at least first (100; 52, 53; 72, 73; 92, 93) and second (23a, 25a; 63a, 65a; 83a, 85a) respective surface features disposed facing one another for an extreme relative axial position of the male and female parts, selectively obtained by completely inserting the barrel (10, 50, 70, 90) into the foot (21, 61, 81), the first and second surface features mutually cooperating to maintain the male (1, 5, 7, 9) and female (2, 6, 8) parts in the extreme relative axial position.

8. Fastening device according to claim 7, characterized in that the first surface feature is formed by a radial protuberance of the barrel.

9. Fastening device according to claim 8, characterized in that the radial protuberance of the barrel is a screw thread (100; 52, 53).

10. Fastening device according to claim 8, characterized in that the radial protuberance of the barrel is a lug (72, 73; 92, 93).

11. Fastening device according to claim 7, characterized in that the second surface feature is formed by the free ends of the prongs (23a, 25a; 63a, 65a; 83a, 85a).

12. Fastening device according to claim 1, characterized in that at least one elastic radial tab (26, 28; 86, 88) is provided in the opening (24) of the cap in order to selectively cooperate with the barrel.

13. Fastening device according to claim 1, characterized in that the inner branch (601, 801) of the cap includes at least two internal elastic tabs (6011, 6012; 8011, 8012) capable of applying pressure to the stack of panels in the locked configuration of the foot.

14. Fastening device according to claim 1, characterized in that the clip is produced by cutting, bending and heat treating a metal blank.

15. Fastening device according to claim 1, characterized in that the clip (2, 6, 8) is made of tempered steel.

16. Fastening device according to claim 1, characterized in that the barrel (70) has a collar (709) inserted into the opening of the cap counter to an elastic force and rendering the male and female parts inseparable from one another.

17. Fastening device according to claim 1, characterized in that the head (11, 51, 71) presses against the outer branch (202, 602), for the locked configuration of the foot (21, 61), and moves the inner and outer branches 601, 602 toward one another so as to generate an elastic stress between them.

18. Fastening device according to claim 1, characterized in that the head (91) passes through the outer branch (802) and comes to rest against the inner branch (801) of the cap (80) for the locked configuration of the foot (81).

19. Fastening device according to claim 18, characterized in that the male part (9) includes a second head (91a) that remains outside the outer branch (802), even for the locked configuration of the foot (91).

20. Assembly constituted by a fastening device according to claim 1 and by a stack of panels (3, 4) in which bores (30, 40) are provided, and including a bottom panel (4), in which assembly the thickness of the stack is between 0.5 and 3 mm, while the bore in the bottom panel has a larger transverse dimension of 7.7 mm.

21. Assembly constituted by a fastening device according to claim 1 and by a stack of panels (3, 4) in which bores (30, 40) are provided, and including a bottom panel (4), in which assembly the thickness of the stack is between 3 and 4.5 mm, while the bore in the bottom panel (4) has a larger transverse dimension of 8.2 mm.

22. Assembly constituted by a fastening device according to claim 1 and by a stack of panels (3, 4) in which bores (30, 40) are provided and including a bottom panel (4), in which assembly the thickness of the stack is between 4.5 and 6 mm, while the bore in the bottom panel (4) has a larger transverse dimension of 8.7 mm.

23. Assembly constituted by a fastening device according to claim 1 and by a stack of panels (3, 4) in which bores (30, 40) are provided and including a bottom panel (4), in which assembly the thickness of the stack is between 6 and 7 mm, while the bore in the bottom panel (4) has a larger transverse dimension of 9.2 mm.

24. Fastening device according to claim 1,
wherein the hollow foot (21, 61, 18) comprises a plurality of prongs (23, 25; 63, 65; 83, 85) having respective attached ends (63b, 65b; 83b, 85b) by which these prongs are joined to the cap (20, 60, 80), and respective radially converging free ends (63a, 65a; 83a, 85a), which between them define the minimum internal transverse dimension (Dmin) of the foot (21,61, 81),
wherein the male (1, 5, 7, 9) and female (2, 6, 8) parts comprise at least first (100; 52, 53; 72, 73; 92, 93) and second (23a, 25a; 63a, 65a; 83a, 85a) respective surface features disposed facing one another for an extreme relative axial position of the male and female parts which is reached when the barrel (10, 50, 70, 90) is substantially completely inserted into the foot (21, 61, 81), the first and second features mutually cooperating to maintain the male (1, 5, 7, 9) and female (2, 6, 8) parts in the extreme relative axial position,
wherein the first surface feature is formed by radial protuberances of the barrel in the form of lugs (72, 73; 92, 93), and
wherein each lug comprises a shoulder on which a blade is bearing when the male and female parts are in their locked configuration.

25. Fastening device comprising a male part (1, 5, 7, 9) and a female part (2, 6, 8) adapted to be inserted into bores (30, 40) passing through a stack of at least two panels (3, 4), wherein the female part (2, 6, 8) is an elastic clip comprising a cap (20, 60, 80) from which extends a hollow foot (21, 61, 81) having different minimum (Dmin) and maximum (Dmax) internal transverse dimensions, wherein the male part (1, 5, 7, 9) comprises a head (11, 51, 71, 91) extended by a barrel (10, 50, 70, 90) having at least a first given intermediate transverse dimension (DI), between the minimum (Dmin) and maximum (Dmax) internal transverse dimensions, the barrel being sized to be inserted into the hollow foot (21, 61, 81) through an opening (24, 64, 84) in the cap, with the hollow foot (21, 81) and the barrel having an unlocked configuration with respect to each other as a function of at least one relative axial positioning of the barrel (10, 50, 70) and the hollow foot (21, 71, 81) and for at least a first relative rotational of the barrel and the foot, with the foot (21, 61, 81) having a reduced transverse dimension in the unlocked configuration, and the hollow foot and barrel having a locked configuration with respect to each other in which the foot (21, 61, 81) is subjected by the barrel (10, 50, 70, 90) to a radial elastic expansion, wherein the cap (20, 60, 80) is formed by a spring blade bent back on itself and comprising at least one inner branch (201, 601, 810) joined to the hollow foot (21, 61, 81) and one outer branch (202, 602, 802) into which the opening (24, 64, 84) of the cap is pierced, and in that the inner and outer branches (201,202; 601, 602; 810, 802) are apart from one another at least for the unlocked configuration of the hollow foot (21, 61, 81) and are shaped so as to allow an elastic deformation of at least part of the outer branch (202, 602, 802) when the foot (21, 61, 81) moves from its unlocked configuration to its locked configuration;

wherein the male (1, 5, 7, 9) and female (2, 6, 8) parts comprise at least first (100; 52, 53; 72, 73; 92, 93) and second (23a, 25a; 63a, 65a; (33a, 85a) respective surface features disposed facing one another for an extreme relative axial position of the male and female parts which is reached when the barrel (10, 50, 70, 90) is substantially completely inserted into the foot (21, 61, 81), the first and second surface features mutually cooperating to maintain the male (1, 5, 7, 9) and female (2, 6, 8) parts in the extreme relative axial position, wherein the first surface feature is formed by a radial protuberance of the barrel, and wherein the first surface feature is a lug (72, 73; 92, 93) disposed facing a corresponding hole (612, 613; 812, 813) in the foot, and the lug passes through the hole when the foot (61, 81) is in both the unlocked configuration and the first rotational position relative to the barrel (70, 90).

26. Fastening device comprising a male part (1, 5, 7,9) and a female part (2, 6, 8) adapted to be selectively inserted into bores (30, 40) passing through a stack of at least two panels (3, 4), wherein the female part (2, 6, 8) is an elastic clip comprising a cap (20, 60, 80) from which extends a hollow foot (21, 61, 81) having different minimum (Dmin) and maximum (Dmax) internal transverse dimensions, wherein the male part (1, 5, 7, 9) comprises a head (11, 51, 71, 91) extended by a barrel (10, 50, 70, 90) having at least a first given intermediate transverse dimension (DI), between the minimum (Dmin) and maximum (Dmax) internal transverse dimensions, the barrel being sized to be inserted into the hollow foot (21, 61, 81) through an opening (24, 64, 84) in the cap, with the hollow foot (21, 61, 81) and the barrel having an unlocked configuration with respect to each other as a function of at least one relative axial position of the barrel (10, 50, 70, 90) and the hollow foot (21, 61, 81), and for at least a first relative rotational position of the barrel and the foot, with the foot (21, 61, 81) having a reduced transverse dimension in the unlocked configuration, and the hollow foot and barrel having a locked configuration with respect to each other in which the foot (21, 61, 81) is subjected by the barrel (10, 50, 70, 90) to a radial elastic expansion, the fastening device being characterized in that the cap (20, 60, 80) is formed by a spring blade bent back on itself and comprising at least one inner branch (201, 601, 801) joined to the hollow foot (21, 61, 81) and one outer branch (202, 602, 802) into which the opening (24, 64, 84) of the cap is pierced, and in that the inner and outer branches (201, 202; 601, 602; 801, 802) are apart from one another at least for the unlocked configuration of the hollow foot (21, 61, 81) and are shaped so as to allow an elastic deformation of at least part of the outer branch (202, 602, 802) when the foot (21, 61, 81) moves from its unlocked configuration to its locked configuration;

wherein the male (1, 5, 7, 9) and female (2, 6, 8) parts comprise at least first (100; 52, 53; 72, 73; 92, 93) and second (23a, 25a; 63a, 65a; 83a, 85a) respective surface features disposed facing one another for an extreme relative axial position of the male and female parts, selectively obtained by completely inserting the barrel (10, 50, 70, 90) into the foot (21, 61, 81), the first and second surface features mutually cooperating to maintain the male (1, 5, 7, 9) and female (2, 6, 8) parts in the extreme relative axial position; and wherein the second surface feature is formed by the free ends of the prongs (23a, 25a; 63a, 65a; 83a, 85a).

27. Fastening device comprising a male part (1, 5, 7,9) and a female part (2, 6, 8) adapted to be selectively inserted into bores (30, 40) passing through a stack of at least two panels (3, 4), wherein the female part (2, 6, 8) is an elastic clip comprising a cap (20, 60, 80) from which extends a hollow foot (21, 61, 81) having different minimum (Dmin) and maximum (Dmax) internal transverse dimensions, wherein the male part (1, 5, 7, 9) comprises a head (11, 51, 71, 91) extended by a barrel (10, 50, 70, 90) having at least a first given intermediate transverse dimension (DI), between the minimum (Dmin) and maximum (Dmax) internal transverse dimensions, the barrel being sized to be inserted into the hollow foot (21, 61, 81) through an opening (24, 64, 84) in the cap, with the hollow foot (21, 61, 81) and the barrel having an unlocked configuration with respect to each other as a function of at least one relative axial position of the barrel (10, 50, 70, 90) and the hollow foot (21, 61, 81), and for at least a first relative rotational position of the barrel and the foot, with the foot (21, 61, 81) having a reduced transverse dimension in the unlocked configuration, and the hollow foot and barrel having a locked configuration with respect to each other in which the foot (21, 61, 81) is subjected by the barrel (10, 50, 70, 90) to a radial elastic expansion, the fastening device being characterized in that the cap (20, 60, 80) is formed by a spring blade bent back on itself and comprising at least one inner branch (201, 601, 801) joined to the hollow foot (21, 61, 81) and one outer branch (202, 602, 802) into which the opening (24, 64, 84) of the cap is pierced, and in that the inner and outer branches (201, 202; 601, 602; 801, 802) are apart from one another at least for the unlocked configuration of the hollow foot (21, 61, 81) and are shaped so as to allow an elastic deformation of at least part of the outer branch (202, 602, 802) when the foot (21, 61, 81) moves from its unlocked configuration to its locked configuration;

wherein the hollow foot (21, 61, 81) comprises a plurality of prongs (23, 25; 63, 65; 83, 85) having respective attached ends (63b, 65b; 83b, 85b) by which these prongs are joined to the cap (20, 60, 80), and respective radially converging free ends (63a, 65a; 83a, 85a), which between them define the minimum internal transverse dimension (Dmin) of the foot (21, 61,81); and wherein the hollow foot (61, 81) comprises two prongs (63, 65; 83, 85) separated from one another by an open space (E) for the unlocked configuration of the foot, and in that the barrel (50, 70, 90) has at least a second transverse dimension (D2), that selectively enters the open space, the result of which is that the hollow foot (61; 81) selectively adopts its unlocked configuration for a second relative rotational position of the barrel (50, 70, 90) and the foot (61, 81), independently from the relative axial position of the male and female parts.

28. Fastening device according to claim 27, characterized in that the male (7) and female (6) parts comprise at least third (714, 715) and fourth (614, 615) respective surface features disposed facing one another for the locked configuration of the foot (61), these third and fourth surface features mutually cooperating to maintain the male (7) and female (6) parts in their first relative rotational position.

29. Fastening device according to claim 28, characterized in that the third (714a, 715a; 914a, 915a) and fourth (614a, 615a; 814, 815a) surface features are respectively constituted by an axial rib of the barrel and by a corresponding cutout of the cap.

30. Fastening device according to claim 28, characterized in that the third and fourth surface features are respectively constituted by a recess of the head and by a boss of the cap.

31. Fastening device comprising a male part (1, 5, 7,9) and a female part (2, 6, 8) adapted to be selectively inserted into bores (30, 40) passing through a stack of at least two panels (3, 4), wherein the female part (2, 6, 8) is an elastic clip comprising a cap (20, 60, 80) from which extends a hollow foot (21, 61, 81) having different minimum (Dmin) and maximum (Dmax) internal transverse dimensions, wherein the male part (1, 5, 7, 9) comprises a head (11, 51, 71, 91) extended by a barrel (10, 50, 70, 90) having at least a first given intermediate transverse dimension (DI), between the minimum (Dmin) and maximum (Dmax) internal transverse dimensions, the barrel being sized to be inserted into the hollow foot (21, 61, 81) through an opening (24, 64, 84) in the cap, with the hollow foot (21, 61, 81) and the barrel having an unlocked configuration with respect to each other as a function of at least one relative axial position of the barrel (10, 50, 70, 90) and the hollow foot (21, 61, 81), and for at least a first relative rotational position of the barrel and the foot, with the foot (21, 61, 81) having a reduced transverse dimension in the unlocked configuration, and the hollow foot and barrel having a locked configuration with respect to each other in which the foot (21, 61, 81) is subjected by the barrel (10, 50, 70, 90) to a radial elastic expansion, the fastening device being characterized in that the cap (20, 60, 80) is formed by a spring blade bent back on itself and comprising at least one inner branch (201, 601, 801) joined to the hollow foot (21, 61, 81) and one outer branch (202, 602, 802) into which the opening (24, 64, 84) of the cap is pierced, and in that the inner and outer branches (201, 202; 601, 602; 801, 802) are apart from one another at least for the unlocked configuration of the hollow foot (21, 61, 81) and are shaped so as to allow an elastic deformation of at least part of the outer branch (202, 602, 802) when the foot (21, 61, 81) moves from its unlocked configuration to its locked configuration; and wherein the head (91) passes through the outer branch (802) and comes to rest against the inner branch (801) of the cap (80) for the locked configuration of the foot (81).

32. Fastening device according to claim 31, characterized in that the male part (9) includes a second head (91a) that remains outside the outer branch (802), even for the locked configuration of the foot (91).

* * * * *